United States Patent
Aggus et al.

[11] Patent Number: 6,088,447
[45] Date of Patent: Jul. 11, 2000

[54] TELEPHONE BASE INCLUDING VISUAL DISPLAY MODULE

[75] Inventors: Trevor J. Aggus, Lincroft; George A. Kopacz, Aberdeen; Steve Oliver Mak, Leonardo; Mark Edward Millman, Holmdel; Bobbie Jo Ridgely, Atlantic Highlands, all of N.J.

[73] Assignee: Lucent Technologies Inc., Murray Hill, N.J.

[21] Appl. No.: 08/818,083

[22] Filed: Mar. 14, 1997

Related U.S. Application Data

[63] Continuation of application No. 08/556,157, Nov. 9, 1995, abandoned.

[51] Int. Cl.$^7$ ...................................................... H04M 1/00
[52] U.S. Cl. ............................................................. 379/428
[58] Field of Search ..................................... 379/428, 429, 379/433, 435, 436, 420; 248/183

[56] References Cited

U.S. PATENT DOCUMENTS

| | | | |
|---|---|---|---|
| 4,790,504 | 12/1988 | Wills et al. | 248/183 |
| 5,761,297 | 6/1998 | Kingsbury et al. | 379/428 |

FOREIGN PATENT DOCUMENTS

| | | | |
|---|---|---|---|
| 0 258 717 A1 | 8/1987 | European Pat. Off. | H04M 1/02 |

*Primary Examiner*—Jack Chiang
*Attorney, Agent, or Firm*—Thomas Stafford; Gregory J. Murgia

[57] ABSTRACT

A telephone instrument is disclosed which includes a swivel visual display module overcome by employing a telephone base having upper and lower housings. A swivel visual display module is pivotally mounted and supported by pivot points in both the upper and lower base housings. At least one cantilever snap member is molded into one of the base housings, for example, the upper base housing, and is employed to engage indents molded into an outer convex surface of the visual display module to hold the visual display module in several angular positions. Additionally, the at least one cantilever snap member is employed to engage a lower edge of the visual display module and in conjunction with stop members on the visual display module to secure the visual display module in a full upright position. The visual display module is secured in its full down position by the at least one cantilever snap member engaging one of the indents which has been strategically placed on the outer convex surface of the visual display module. In one embodiment, the visual display module is a unitary molded arrangement. Additionally, at least two cantilever snap members are integrally molded into the upper housing of the base unit and a plurality of corresponding indents have been appropriately molded into the outer convex surface of the visual display module. The cantilever snap members in conjunction with the indents allow the securing of the visual display member at individual ones of a plurality of angular positions.

1 Claim, 5 Drawing Sheets

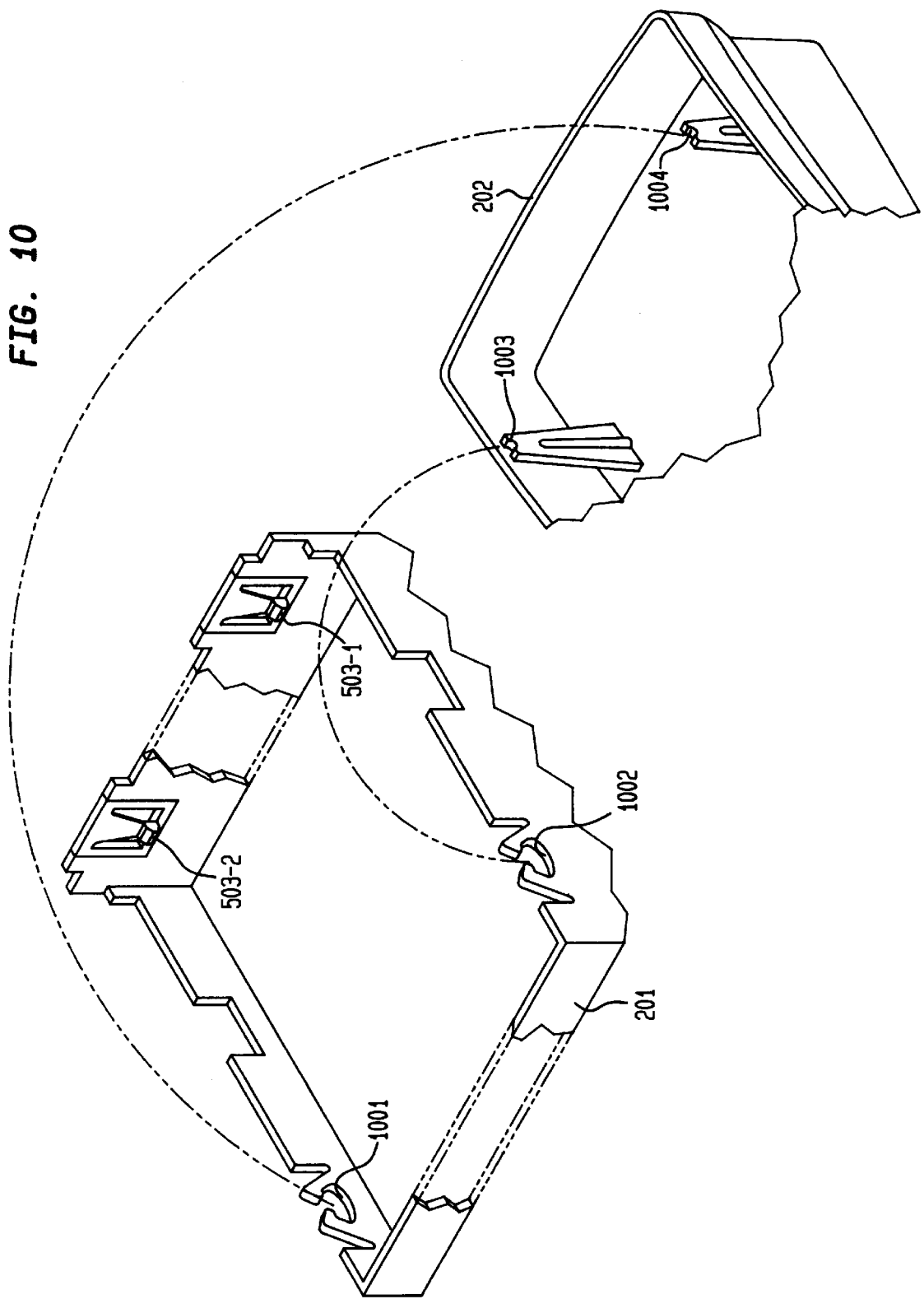

TELEPHONE BASE INCLUDING VISUAL DISPLAY MODULE

This application is a continuation application Ser. No. 08/556,157, filed on Nov. 9, 1995 now abandoned.

TECHNICAL FIELD

This invention relates to telephone base modules and, more particularly, to a telephone base including a swivel visual display module.

BACKGROUND OF THE INVENTION

Telephone instruments conventionally include a telephone base and a handset which is supported by the base when the telephone is not in use. Some more recent telephone devices have included a visual display module that is incorporated into the base. The visual display module is used to convey information to a user such as the telephone number of an incoming call, the telephone number of an outgoing call, a directory of telephone numbers or the like. For convenience of the user, the visual display module can be pivotally mounted in the base so that it may be tilted to a desired angular position for ease of reading the displayed information. Arrangements have also been provided to hold the visual display module in the desired tilted angular position. Unfortunately, prior known arrangements for holding the visual display in the desired tilted position have been found to be unduly complex and relatively expensive to implement. One particular arrangement employs a pivotally mounted visual display module having an outer convex surface including a plurality of parallel grooves in it. Leaf spring members which are physically mounted between upper and lower housings of the base unit are employed to hold the visual display by engaging the grooves therein. A problem with using such a leaf spring arrangement is that the leaf springs are expensive and they also require to be physically placed between the upper and lower housings of the base unit. This adds more expense to the overall telephone instrument.

SUMMARY OF THE INVENTION

The problems and limitations of prior known telephone instruments including a swivel visual display module are overcome by employing a telephone base having upper and lower housings. A swivel visual display module is pivotally mounted and supported by pivot points in both the upper and lower base housings. At least one cantilever snap member is molded into one of the base housings, for example, the upper base housing, and is employed to engage indents molded into an outer convex surface of the visual display module to hold the visual display module in several angular positions.

Additionally, the at least one cantilever snap member is employed to engage a lower edge of the visual display module and in conjunction with stop members on the visual display module to secure the visual display module in a full upright position. The visual display module is secured in its full down position by the at least one cantilever snap member engaging one of the indents which has been strategically placed on the outer convex surface of the visual display module.

In one embodiment, the visual display module is a unitary molded arrangement. Additionally, at least two cantilever snap members are integrally molded into the upper housing of the base unit and a plurality of corresponding indents have been appropriately molded into the outer convex surface of the visual display module. The cantilever snap members in conjunction with the indents allow the securing of the visual display member at individual ones of a plurality of angular positions.

BRIEF DESCRIPTION OF THE FIGURES

FIG. 10 is a breakaway perspective view of the upper and lower base housings showing the relationship of the members forming the swivel visual display module pivot points.

DETAILED DESCRIPTION

Figure 1:
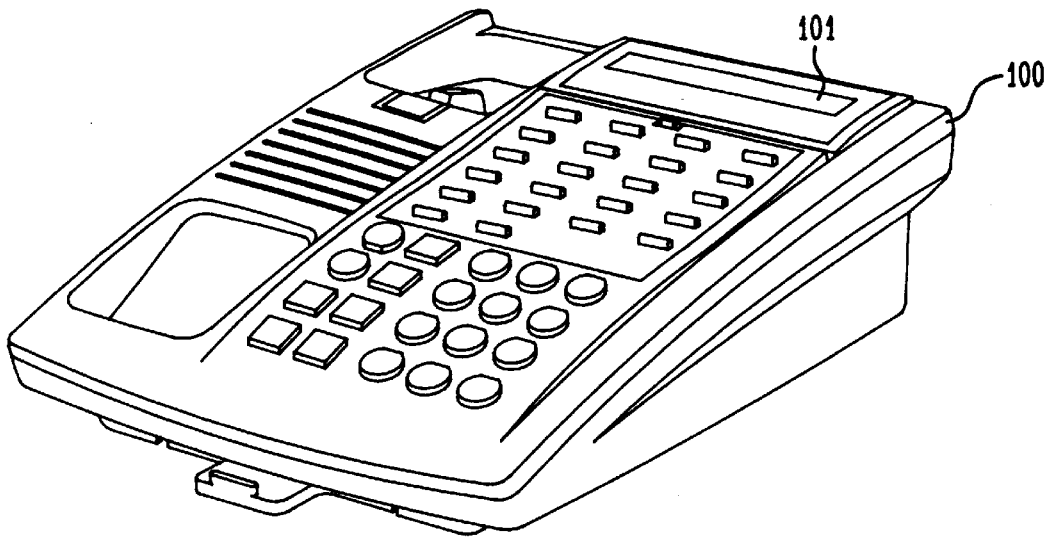
FIG. 1 is a perspective view of a telephone base in which the invention may be employed.

FIG. 1 is a perspective view of telephone base unit 100 including a visual display module 101 incorporating the invention. Such telephone base units are known in the art.

Figure 2:
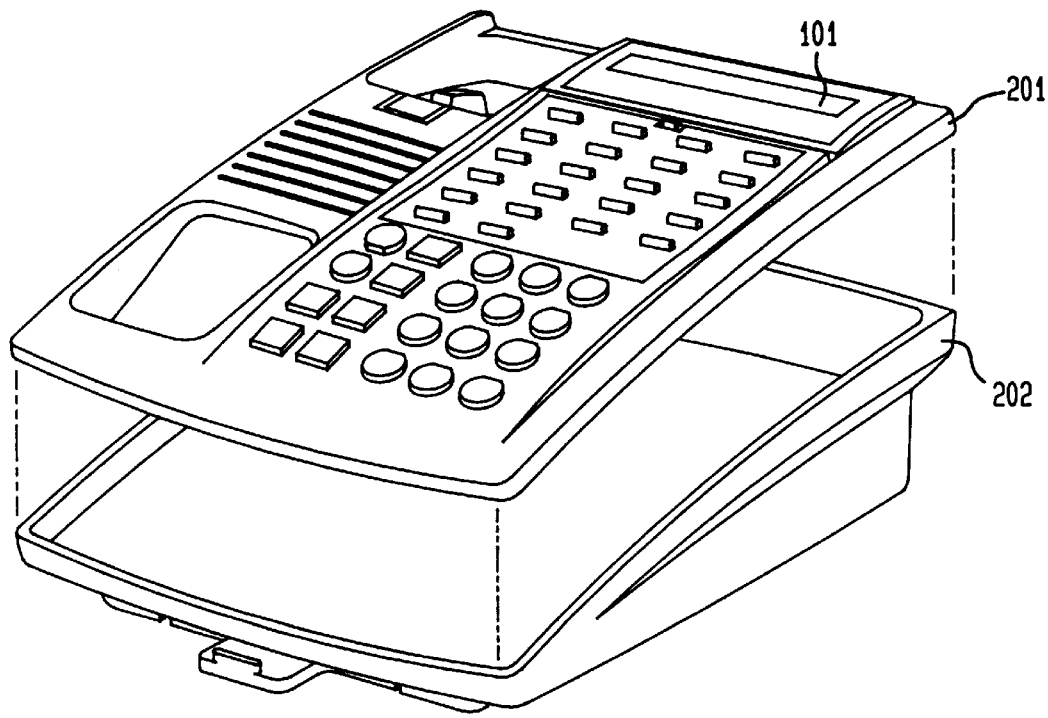
FIG. 2 is an exploded view of the telephone base showing an upper base housing and a lower base housing.

FIG. 2 is an exploded view of the telephone base unit 100 showing an upper base housing 201 including the visual display module 101 and a lower base housing 202.

Figure 3:
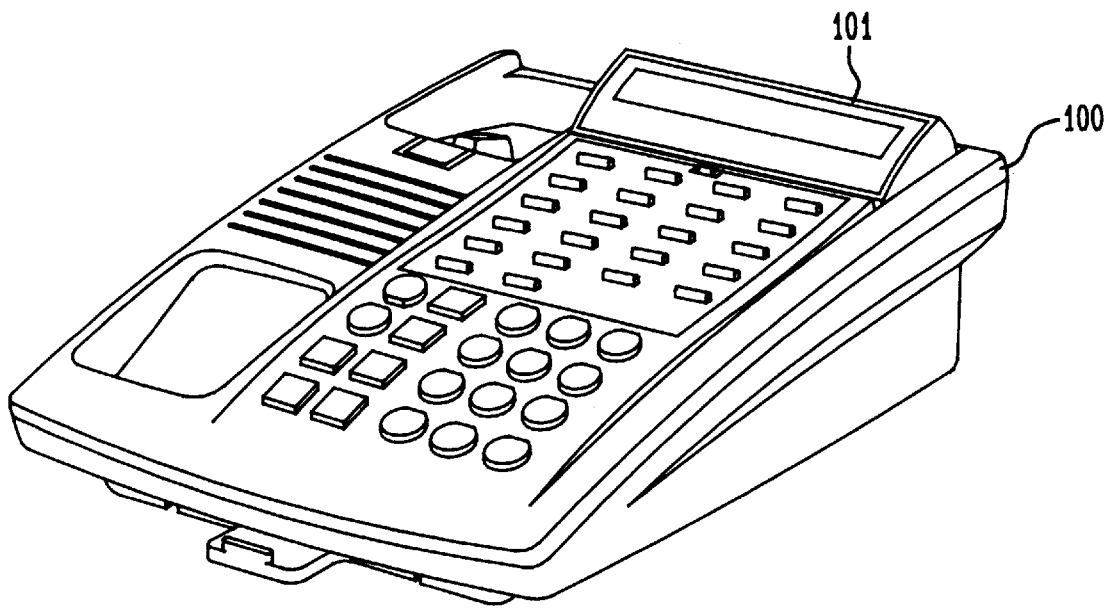
FIG. 3 is another perspective of the telephone base showing a swivel visual display module in a partially elevated position.

FIG. 3 is another perspective view of telephone base 100 showing the visual display module 101 in a partially elevated angular position.

Figure 4:
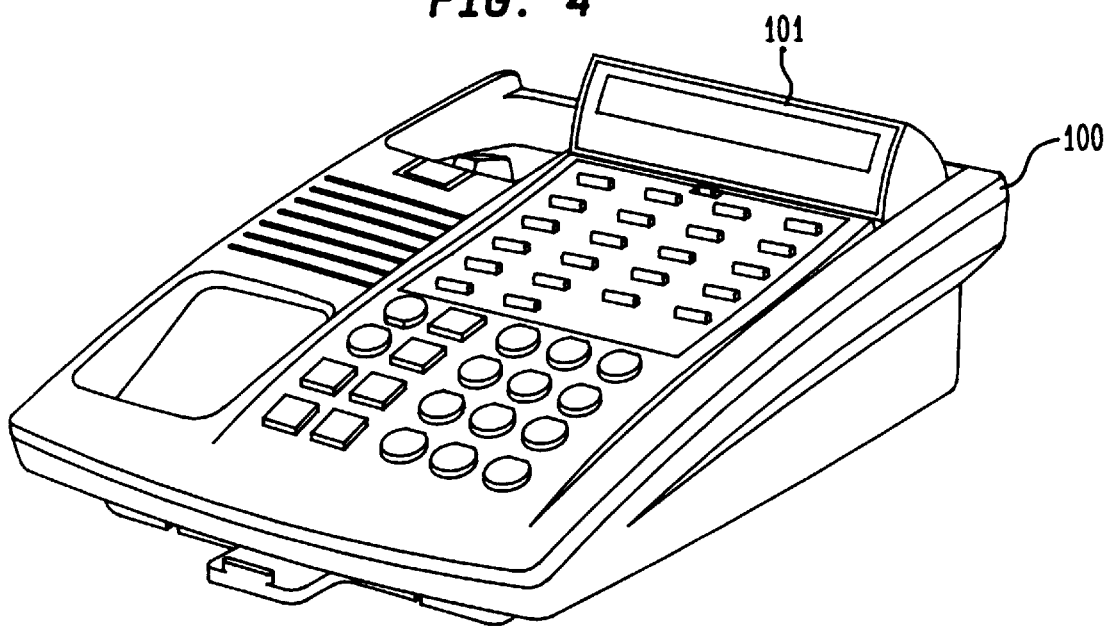
FIG. 4 is another perspective of the telephone base showing a swivel visual display module in a fully elevated position.

FIG. 4 is still another perspective view of telephone base 100 showing the visual display module 101 in a fully elevated angular position.

Figure 5:
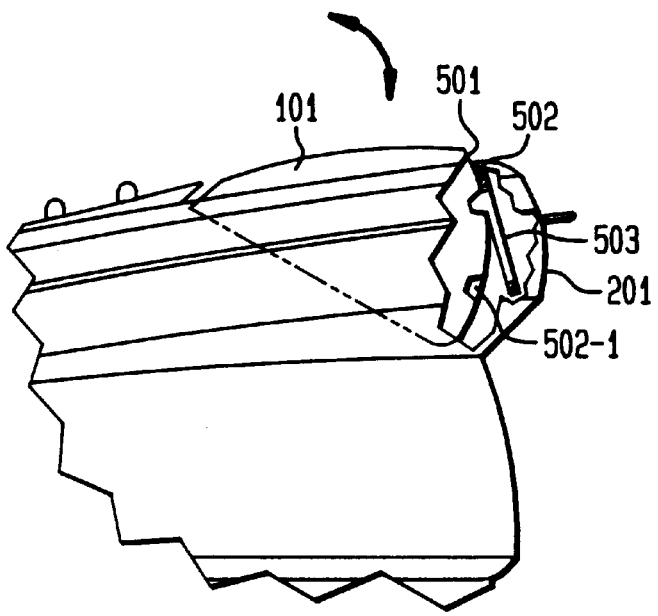
FIG. 5 illustrates a cutaway right side view of the swivel visual display module showing the mechanism for indexing the swivel visual display.

FIG. 5 illustrates a cutaway right side view of visual display module 101 showing the mechanism for indexing the visual display module in a plurality of angular positions. To this end, the outer convex surface 501 of visual display module 101 includes a plurality of indents 502-1 through 502-n molded therein. Additionally, shown is cantilever snap member 503 which in this example is integrally molded into the upper base housing 201. The cantilever snap member is essentially like a spring member that allows the indexing of visual display module 101 via the indents 502 to a plurality of angular positions as desired by a user. It should be noted that since the cantilever snap member 503 is part of the upper housing it does not require any physical placement as the prior art arrangements that used springs or the like.

Figure 6:
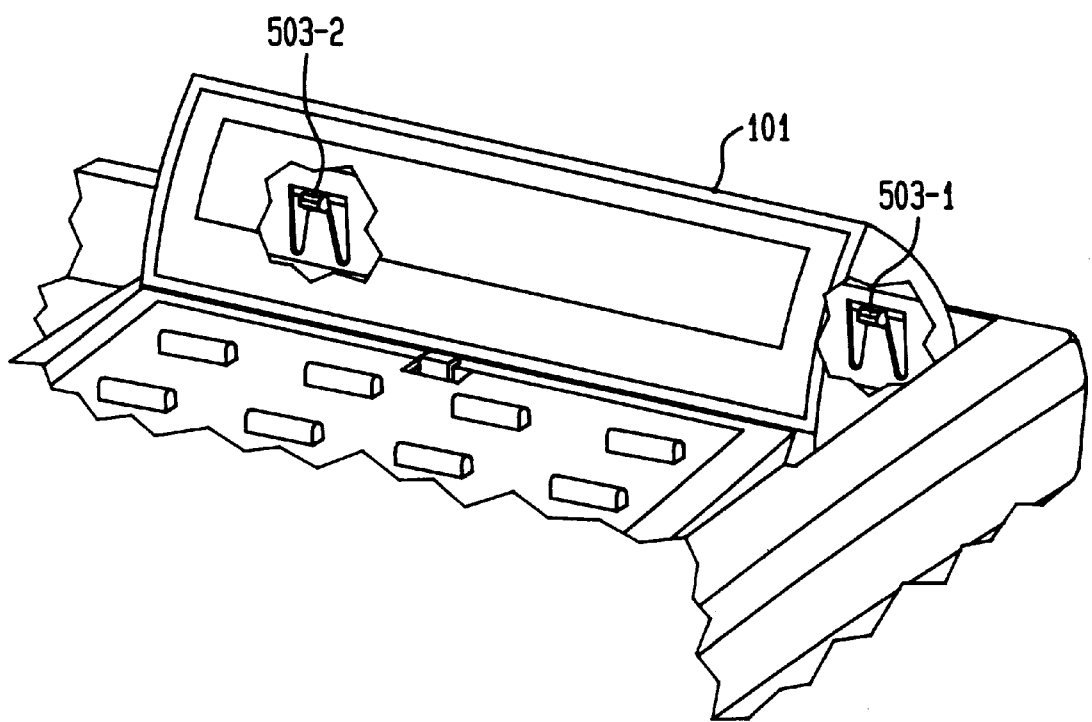
FIG. 6 shows a perspective front cutaway view of the swivel visual display module showing the cantilever snap members.

FIG. 6 shows a perspective front cutaway view of visual display module 101 illustrating at least two cantilever spring members 503-1 and 503-2. It should be noted that if desired, only one such cantilever snap member may be employed with appropriate indents molded in the convex outer surface of visual display module 101. Alternatively, any number of such cantilever snap members 503 and corresponding indents molded into the convex outer surface of visual display module 101 may be employed. However, in the preferred embodiment only two such cantilever snap members 503-1 and 503-2 are employed.

Figure 7:
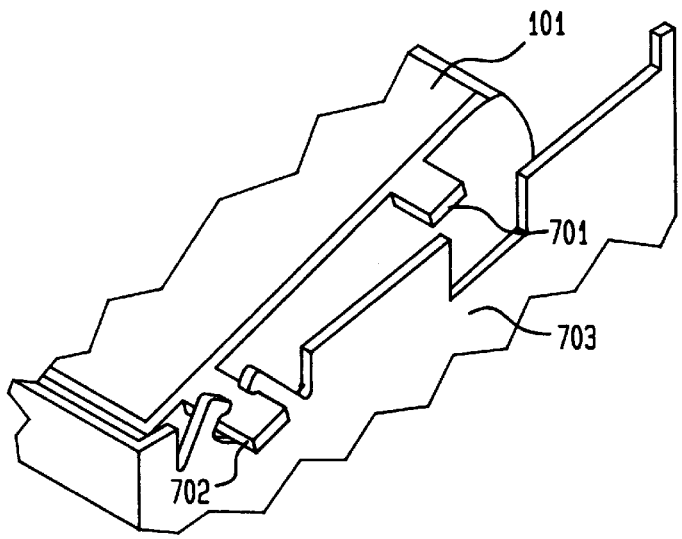
FIG. 7 shows a bottom perspective view of the swivel visual display module illustrating a stop and pivot member in the base upper housing.
Figure 8:
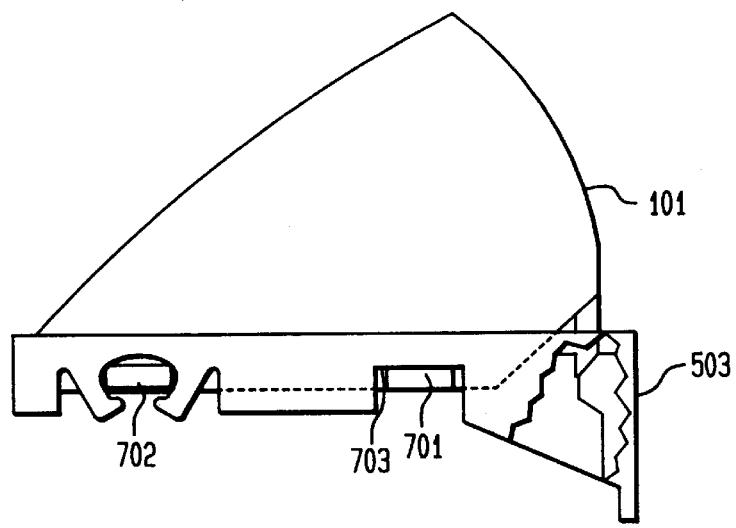
FIG. 8 is a right side breakaway view of the swivel visual display module illustrating the pivot member, the stop and the cantilever snap member when the visual display is in a full elevated position.

FIG. 7 shows a bottom perspective view of visual display module 101 including a stop member 701 and pivot member 702. Note that the visual display module will rotate about the pivot member 702 and when it is in a full upright angular position stop 701 will engage surface 703 to secure it in a full upright position. This is illustrated in FIG. 8 which is a right side breakaway view of visual display module 101 illustrating the position of the pivot member 702, stop member 701 on surface 703 and one of cantilever snap members 503 engaging the lower edge of the visual display module 101. The combination of the stop 701 and the cantilever snap member 503 secures the visual display module in a fully elevated position.

Figure 9:
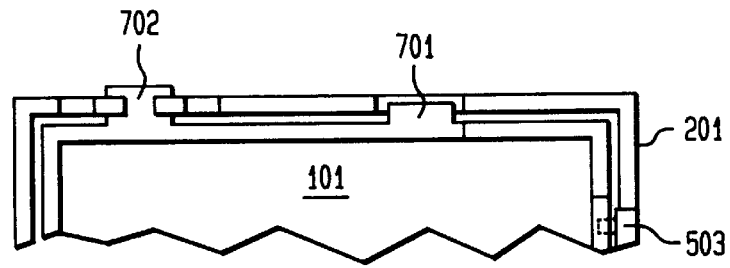
FIG. 9 is a bottom view showing the base upper housing and the bottom of the swivel visual display module in the fully elevated position.

FIG. 9 is a bottom view showing the base upper housing 201 and bottom of visual display module 101 in its fully elevated position. Again, the visual display module 101 is secured in its position via pivot member 702, stop member 701 and cantilever snap member 503 as shown.

FIG. 10 is a breakaway perspective view of upper base housing 201 and lower base housing 202 illustrating cantilever snaps 503-1 and 503-2 along with pivot members 1001, 1002, 1003 and 1004.

As can be seen from the above description, the cantilever snap members are molded into the upper base housing and therefor eliminates the need for any additional spring members which would have to be physically placed between the upper and lower base housings as in the prior art. Additionally, the visual display module is a unitary molded unit which also improves any electrostatic discharge from the unit. The prior known display units appear to be made of two sections and would require some kind of shielding or other arrangement to minimize such electrostatic discharge.

What is claimed is:

1. A telephone base unit comprising:

an upper base housing;

a lower base housing;

a visual display module pivotally mounted in said base unit, said visual display module having a bottom surface, an outer convex surface, and a viewing surface which is visible from said upper base housing, said visual display module having a plurality of indents in said outer convex surface; and at least one cantilever snap member being molded into one of said base housings and being arranged to engage said indents in said visual display module for indexing said visual display module at a plurality of angular positions, said at least one cantilever snap member engaging the bottom surface of said visual display module when securing said visual display module in a fully elevated angular position so that the bottom surface of said visual display module is seated on top of said at least one cantilever snap member.

* * * * *